United States Patent [19]

Beier

[11] Patent Number: 4,761,795
[45] Date of Patent: Aug. 2, 1988

[54] RECEIVER FOR BANDSPREAD SIGNALS

[75] Inventor: Wolfgang Beier, Weil der Stadt, Fed. Rep. of Germany

[73] Assignee: Standard Elektrik Lorenz AG, Stuttgart, Fed. Rep. of Germany

[21] Appl. No.: 4,467

[22] Filed: Jan. 20, 1987

Related U.S. Application Data

[63] Continuation-in-part of Ser. No. 758,191, Jul. 23, 1985, Pat. No. 4,672,629, and a continuation-in-part of Ser. No. 929,935, Nov. 12, 1986, Pat. No. 4,719,469.

[30] Foreign Application Priority Data

Jan. 21, 1986 [DE]  Fed. Rep. of Germany ....... 3601576

[51] Int. Cl.$^4$ ............................................. H04K 1/102
[52] U.S. Cl. ............................................................ 375/1
[58] Field of Search ............................................ 375/1

[56] References Cited

U.S. PATENT DOCUMENTS

| | | | |
|---|---|---|---|
| 4,221,005 | 9/1980 | La Flame | 375/1 |
| 4,291,409 | 9/1981 | Weinberg et al. | 375/1 |
| 4,327,438 | 4/1982 | Baier et al. | 375/1 |
| 4,384,293 | 5/1983 | Deem et al. | 343/113 R |
| 4,470,145 | 9/1984 | Williams | 375/1 |
| 4,485,477 | 11/1984 | Nossen | 375/1 |
| 4,528,674 | 7/1985 | Sweeney et al. | 375/1 |
| 4,530,103 | 7/1985 | Mosley, Jr. et al. | 375/1 |
| 4,575,861 | 3/1986 | Levreault | 375/1 |
| 4,606,039 | 8/1986 | Nicolas et al. | 375/1 |
| 4,651,327 | 3/1987 | Fujita | 375/1 |
| 4,672,629 | 6/1987 | Beier | 375/1 |

FOREIGN PATENT DOCUMENTS 55-117977  9/1980  Japan .

OTHER PUBLICATIONS

A. C. Davies et al., "Synchronisation of a Spread-Spectrum Receiver by a Microprocessor-Control System", *Conf. Proc. on Microprocessors in Automation and Communications*, Canterbury, Sep. 19-22, 1978, pp. 449-455.
A. Baier, "A Low-Cost Digital Matched Filter for Arbitrary Constant-Envelope Spread-Spectrum Waveforms", *IEEE Trans. Communications*, Apr. 84, pp. 354-361.
Schriftenreih Universitarer Studiengang Vermessungswesen, Universitat der Bundeswehr Munchen, Oct., 1985, No. 20-1.

*Primary Examiner*—Salvatore Cangialosi
*Attorney, Agent, or Firm*—Christie, Parker & Hale

[57] ABSTRACT

An improved receiver for modulated bandspread carrier signals is disclosed. The invention includes an antenna for intercepting a plurality of modulated carrier signals bandspread at a first clock rate; a radio frequency section in communication with the antenna for selecting a received signal from the plurality of signals; and an intermediate frequency section in communication with the radio frequency section for converting the received signal to an intermediate frequency signal. The intermediate frequency signal is digitized and multiplied by a pseudo-random code stored in a first memory for demodulation. Successive demodulation products are added, stored and used to provide in-phase (I) and quadrature (Q) signals. Means are provided to for utilizing the I and Q signals to control the rate and the timing of the multiplication of the digitized signal with the pseudo-random code stored in the first memory.

13 Claims, 3 Drawing Sheets

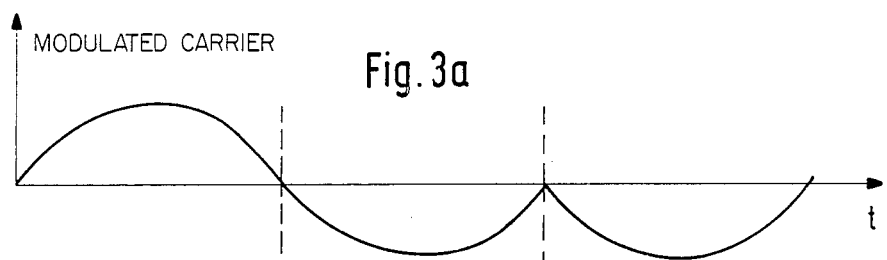
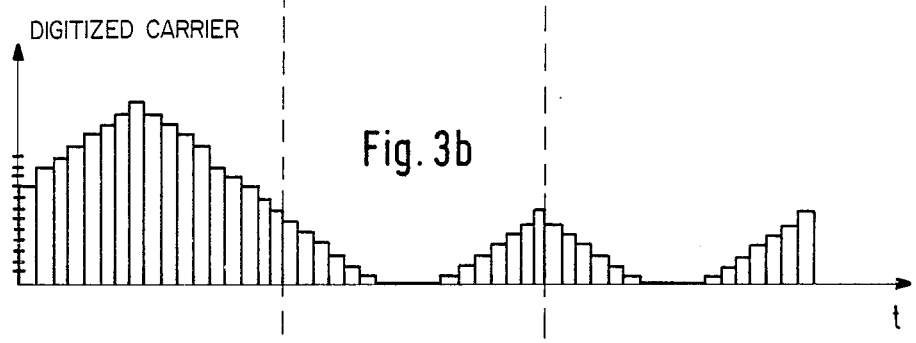
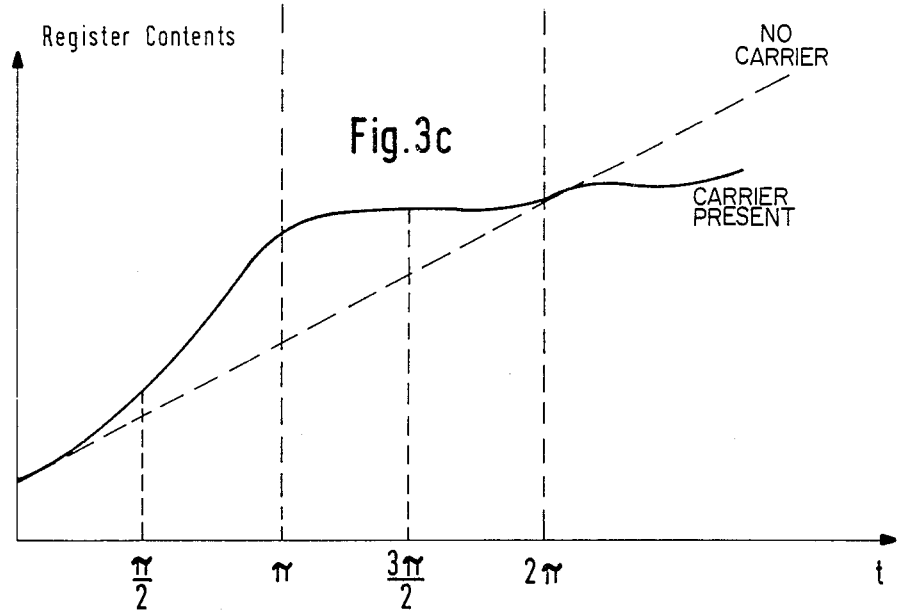

RECEIVER FOR BANDSPREAD SIGNALS

REFERENCE TO RELATED APPLICATION

This is a continuation-in-part of my co-pending U.S. applications Ser. No. 758,191, filed on July 23, 1985 now U.S. Pat. No. 4,672,629 and Ser. No. 929,935, filed on Nov. 12, 1986, now U.S. Pat. No. 719,469, which are respectively entitled "Receiver for Bandspread Signals" and "Direction-Determining System."

BACKGROUND OF THE INVENTION

1. Field of the Invention

The present invention relates generally to communication systems. More particularly, the present relates to a receiver for bandspread signals.

While the present invention is described herein with reference to a particular embodiment for a particular application, it is understood that the invention is not limited thereto. Those having ordinary skill in the art and access to the teachings provided herein will recognize additional modifications, applications, and embodiments within the scope of the invention.

2. Description of the Related Art

In the field of signal processing, bandspread signals are signals in which a high frequency carrier is encoded with a pseudo-random code (hereinafter PRC). The PRC, which is a digital spectrum-spreading code, is modulated by a modulation signal and is employed for data transmission. The modulation signal is often also a digital signal. In such a case, the second digital signal is superimposed on the first digital signal (e.g. the PRC) for data transmission. Generally, the clock rates of the first digital signal (PRC) and the second digital (modulation signal) are significantly different.

The PRC is employed by the transmitter for bandspreading signals and is also stored in the receiver. Moreover, the receiver also contains a clock pulse generator for controlling the read-out of the PRC of memory. The phase of the clock signal must be controlled so that the PRC stored in the receiver is aligned with that of the received signal. The distance of the transmitter from the receiver can be determined by the phase shift between the received PRC and the stored PRC.

Systems employing bandspread signals are, for example, the JTIDS (Joint Tactical Information Display System) and the GPS (Global Positioning System). The GPS is described in "Navigation: Journal of the Institute of Navigation", Vol. 25, No. 2, Summer 1978, pages 121 to 146. The article is entitled "GPS Signal Structure and Performance Characteristics", by J. J. Spiker, Jr.. Receivers for bandspread signals are described on pages 139 to 146 of the above-cited GPS publication. The implementation of such receivers is very complicated and costly.

A receiver for modulated bandspread signals is also disclosed in the above-identified parent application. This receiver is easy to implement and suited for very large-scale integration. A number of functions can be performed by a computer. The RF section requires minimal circuitry. In particular, no frequency nor amplitude control means are necessary. The receiver can be easily expanded to permit communication with several satellites on a time-division multiplexed basis. This is necessary particularly if it is implemented as a GPS receiver. The received signal is digitized in such a way that the digital signal has a first or a second value depending on given criteria. Such a receiver is suitable for the C/A code of the GPS system.

The object of the present invention is to provide a receiver having the properties of the receiver disclosed in the parent application in such a way that it is also suitable for processing the P-code of a GPS system.

Another object of the present invention is to provide a receiver which is capable of processing both the C/A and P codes of a GPS system with lower losses.

These and other objects and advantages of the present invention will become apparent to those of ordinary skill in the art having access to the teachings provided herein.

SUMMARY OF THE INVENTION

The present invention provides an improved receiver for modulated bandspread carrier signals. The invention includes an antenna for intercepting a plurality of modulated carrier signals bandspread at a first clock rate; a radio frequency section in communication with the antenna for selecting a received signal from the plurality of signals; and an intermediate frequency section in communication with the radio frequency section for converting the received signal to an intermediate frequency signal. The intermediate frequency signal is digitized and multiplied by a pseudo-random code stored in a first memory for demodulation. Successive demodulation products are added, stored and used to provide in-phase (I) and quadrature (Q) signals. Means are provided to for utilizing the I and Q signals to control the rate and the timing of the multiplication of the digitized signal with the pseudo-random code stored in the first memory.

IN THE DRAWINGS

FIGS. 3a to 3c are graphs of signals illustrative of the operation of the receiver of the present invention.

DESCRIPTION OF THE INVENTION

Figure 1A:
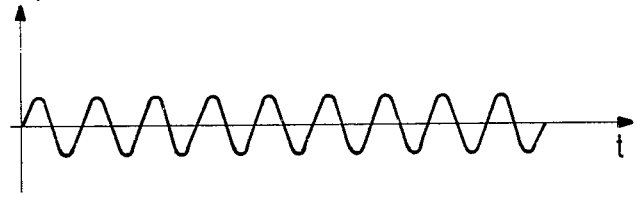
FIGS. 1a to 1c are graphs illustrating a typical bandspread signal.
Figure 1B:
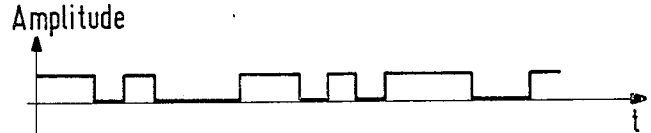
Figure 1C:
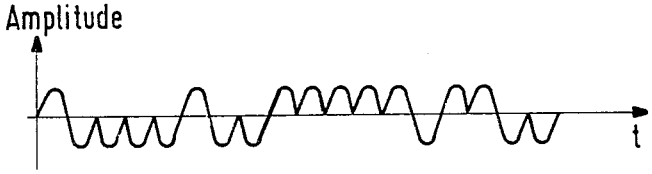

As is known in the art, a bandspread signal is generated by modulating a radio frequency (rf) carrier signal with a digital pseudo-random code PRC. A typical rf carrier is illustrated in FIG. 1a. FIG. 1b shows a typical pseudo-random code. The frequency of the carrier is typically in the range of 1 GHz while the PRC is typically in the range of 1 MHz. The modulation of the carrier with the PRC is such as the induce a phase shift of 180 degrees depending on whether the PRC is in the "0" or "1" state. The signal so produced is illustrated in FIG. 1c and is hereinafter referred to as the "carrier signal". This carrier may be used to measure distance or transmit data as is known in the art. To measure distance, the phase delay between the received PRC and the stored PRC is used. The Global Positioning System is is believed to be one in which a bandspread signal is used for ranging and data transmission.

Figure 2:
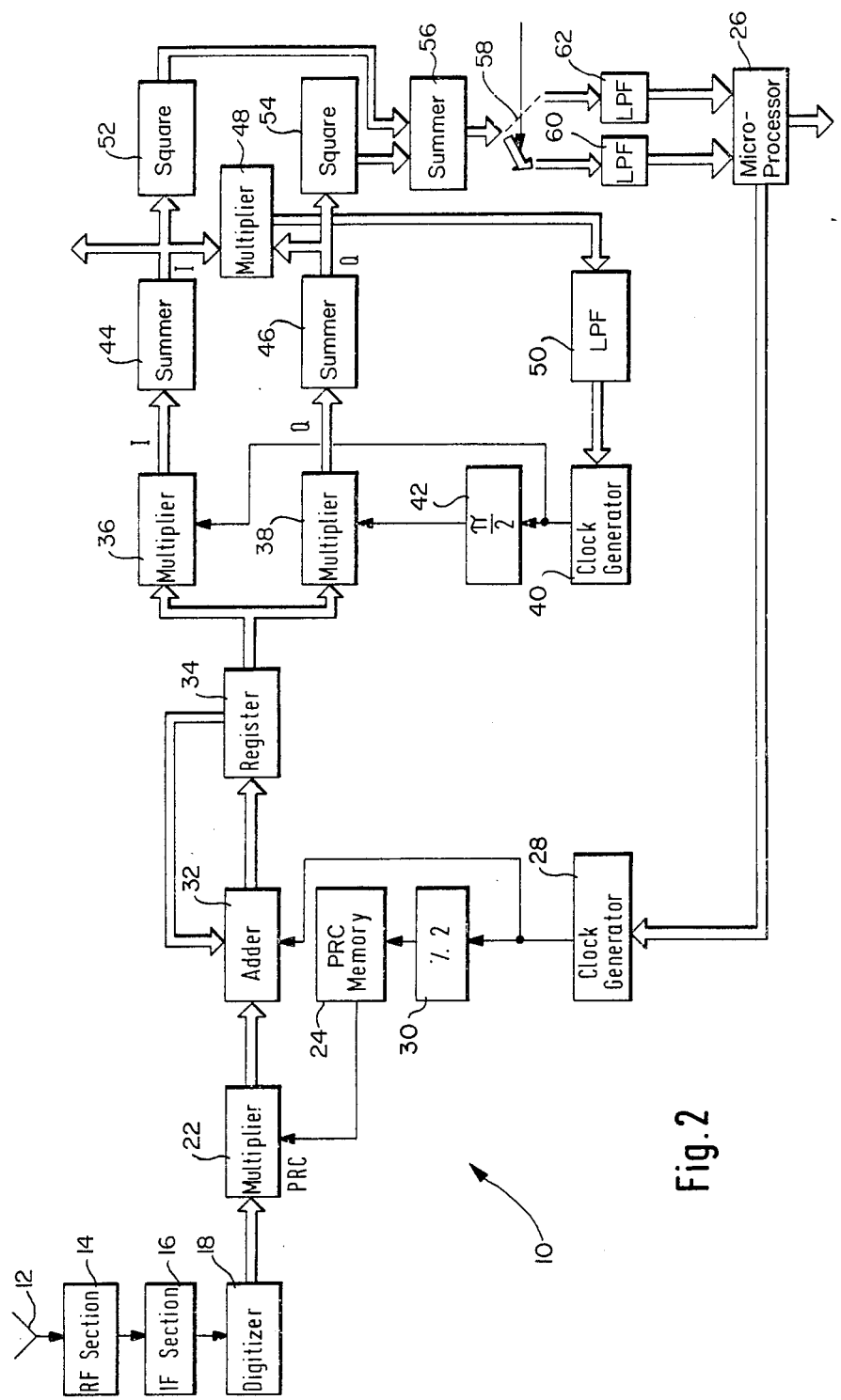
FIG. 2 is a block diagram of an illustrative implementation of the receiver for bandspread signals constructed in accordance with the teachings of the present invention.

FIG. 2 shows a receiver 10 for bandspread signals incorporating the principles of the present invention. The signal bandspread with a pseudo-random code and modulated with a data signal is received by a conventional antenna 12. The received signal is downconverted by an RF section 14. The RF section 14 is followed by an IF section 16 as is known in the art. As illustrated in FIG. 3a, the IF signal is chosen to be nonzero even if the maximum expected doppler shift occurs. The IF signal is digitized in a digitizer or A/D converter 18. The digitization is performed as follows. The amplitude range of the signals to be digitized (positive and negative amplitudes) is divided into a number of like subranges. Each of the subranges is assigned a given number. The greatest number is assigned to the subrange with the greatest positive amplitudes, and the (smallest) number 0 to the subrange with the greatest negative amplitudes. If the digitization into 4 bits is performed, 16 numerical values are obtained. FIG. 3b shows an illustrative digitized signal.

A noise signal is superimposed on the received carrier signal. The noise signal is approximately 20 dB higher than that of the received carrier signal as modulated with data. In the absence of a carrier signal, the frequency distribution of the digitized signals is symmetrical about an average value.

The received digitized signal is demodulated to remove the bandspreading PRC by multiplication with a with an identical PRC in a multiplier 22. The rate and timing of the readout of the PRC by a memory 24 is controlled by a microprocessor 26 via a clock generator 28 and a divider 30 as discussed more fully below. Beyond the multiplier 22, the "0" and "1s" will no longer be distributed equally throughout the digitizer signal if the received carrier signal is present whether the modulation signal is present for data transmission or not. The distribution or the frequency of occurrence of "0" and "1s" will change at the IF signal frequency of the carrier signal as illustrated in FIG. 3a and 3b. If the received carrier signal is not subjected to a doppler shift the frequency of occurrence of "0" and "1s" will change at the rate of 5 KHz. However, if the signal has the expected doppler frequencies, the frequency of change will be between 500 and 9.5 KHz.

Successive demodulation products are added by an adder 32 and stored in a register 34. That is, the register 34 feeds the product from the previous clock cycle back to the adder 32 for addition to the product for the present cycle. The time sequence or rate of the additions is approximately twice as high as the clock rate of the bandspreading code. When the summed signals exceed the maximum threshold of the register 32 the register overflows. The resulting jump in the numerical values does not affect the further evaluation. In the absence of a carrier signal, the register contents increase linearly, as shown by the broken line in FIG. 3c. In the presence of a carrier signal, whether with or without a modulating signal, the variation of the register contents with time (shown by the solid line in FIG. 3c) gives a line whose slope is alternately greater and less than that representing the linear increase of the count. The register contents are continuously fed to two multipliers 36 and 38. Each of these multipliers 36 and 38 is supplied with a signal from a clock generator 40 which consists of a regular sequence of "+1s" and "−1s". The clock rate is equal to the intermediate frequency. That is, it contains any doppler shift that may be present. The signal for the one of the multipliers 38 is shifted by a phase shifter 42 with respect to the signal for the multiplier 36 by a quarter period of the IF signal. The output signals from the two multipliers 36 and 38 correspond to conventional I and Q signals and are used to produce control signals.

In a first summing circuit 44 and a second summing circuit 46, a single sum is formed for each period of the clock signal provided by the generator 40. Those sums are:

$$I = -Z(O) + 2Z(pi) - Z(2pi) \quad [1]$$

and $$Q = -Z(O) + 2Z(pi/2) - 2Z(3pi/2) + Z(2pi) \quad [2]$$

where the addends are the respective register contents at the instants enclosed by parentheses. The sums I and Q are multiplied together in a multiplier 48. The values resulting from the multiplication are fed to a digital low-pass filter 50. The output signal of the low pass filter 50 controls the frequency and the phase of the clock generator 40 in such a way that the output signal of the generator 40 has the same phase and frequency as the carrier signal converted to the IF value. The multiplier 36 and 38, the summing circuits 44 and 46, the lowpass filter 50, the clock generator 40 and the phase shifter 42 form a Costas loop.

In the steady state, the sequence of numerical values I delivered by the summing circuit 44 represents the modulating signal from which the data transmitted via the modulating signal is recovered in as is known in the art. The values I and Q (often referred to as in-phase and quadrature signals) are also supplied squaring circuits 52 and 54. The squares of the I and Q components are summed in a third summing circuit 56. The summed values represent the amplitude of the carrier signal. The summed values are alternately input by a switch 58 to first and second digital low pass filters 60 and 62 respectively. Switching occurs at the dither frequency, that is, the rate at which the PRC is read from the memory 24, e.g. 125 Hz. The signals output from the low pass filters 60 and 62 are fed to the microprocessor 26 where the sums and differences between the values provided by the filters 60 and 62 are calculated. With this data, control signals are derived in a manner well known in the art. The control signals control the rate and the phase of the clock signal of the clock generator 28. The clock signal is halved by the divider 30 and used to control the output of the PRC from the memory 24. The clock signal is also input to the adder 32. Phase control is thereby performed in such a manner that the PRC stored in the receiver has the same phase as the PRC of the received signal. The time position of the PRC referred to a reference is proportional to the distance between the receiver and the transmitting station and is supplied to processing circuitry (not shown).

The memory 24, clock generator 28, divider 30, adder 32, register 34, multipliers 36 and 38, summing circuits 44 and 46, squaring circuits 52 and 54, summing circuit 56, low pass filters 60 and 62 are microprocessor 26 form an early/late control loop. With respect to both the Costas loop and the early/late control loop, the necessary clock signals are not illustrated as such would be obvious to one of ordinary skill in the art.

Thus, the present invention has been described with reference to an illustrative embodiment for a particular application. Those of ordinary skill in the art and access to the teachings provided herein will recognize additional modifications, applications and embodiments within the scope thereof. For example, the invention is not limited to any particular implementation. The multiplier 22 may be a digital multiplier or a read only memory. The adder 32 may be a parallel or serial adder, or the function may be implemented by a computer. The invention is not limited to any particular application. For example, the invention is well suited for a Global Positioning System where there is a need for a specific PRC for each satellite to facilitate simultaneous or rapid successive distance measurements between satellites. That is, this can be accomplished using a time division multiplexing scheme assuming the PRCs for the various satellites are suitably stored in the receiver. Switching and control would be under the control of a computer or microprocessor to facilitate uninterrupted operation.

Thus it is intended by the appended Claims to cover any and all such modifications, applications, and embodiments within the scope of the invention.

Accordingly,

What is claimed is:

1. A receiver for modulated bandspread carrier signals comprising, in combination:
    an antenna for intercepting a plurality of modulated carrier signals bandspread at a first clock rate;
    a radio frequency section in communication with said antenna for selecting a received signal from said plurality of signals;
    an intermediate frequency section in communication with said radio frequency section for converting said received signal to an intermediate frequency signal;
    digitizing means connected to said intermediate frequency section for digitizing said intermediate frequency signal, for digitizing means includes means for linearly dividing the amplitude range of said intermediate frequency signal into a number of subranges and for assigning consecutive digital numbers to said subranges;
    first multiplication means connected to said digitizing means for demodulating said digitized signal with a pseudorandom code stored in a first memory of said receiver;
    register means for adding successive products provided by said first multiplication means;
    means for operating on the output of said register means to provide in-phase (I) and quadrature (Q) signals, including
        second multiplication means adapted to multiply said sum stored in said register by a first signal from a first clock pulse generator,
        first summing means for summing the output of said second multiplication means, the output of said first summing means having the form:

$I = -Z(O) + 2Z(pi) - Z(2pi)$, third multiplication means adapted to multiply said sum stored in said register by a second signal from said first clock pulse generator, said first signal being offset from said second signal from said first clock pulse generator by a predetermined phase shift of pi/2, and
        second summing means for summing the output of said third multiplication means, the output of said second summing means having the form:

$Q = -Z(O) + 2Z(pi/2) - 2Z(3pi/2) + Z(2pi)$;

and
    control means for utilizing said I and Q signals to control the timing of the multiplication of said digitized signal with the pseudo-random code stored in said first memory.

2. The receiver of claim 1 wherein said number of subranges is 16.

3. The receiver of claim 1 wherein said register means includes an adder for summing the numerical values resulting from said demodulation at successive time intervals.

4. The receiver of claim 3 wherein said register means includes a register for storing the sums provided by said adder at successive time intervals.

5. The receiver of claim 3 wherein the rate of additions is approximately twice as high as said first clock rate.

6. The receiver of claim 1 wherein said means for providing I and Q signals further includes first and second summing means for summing the outputs of said second and third multiplication means respectively.

7. The receiver of claim 1 wherein said means for providing I and Q signals further includes fourth multiplication means for multiplying the outputs of said first and second summing means.

8. The receiver of claim 7 wherein said means for providing I and Q signals further includes first low pass filter means for providing the filtered output of said fourth multiplication means to said first clock pulse generator to synchronize the output of said clock pulse generator with the phase and frequency of said carrier signal.

9. The receiver of claim 8 further including first and second circuits for squaring the outputs of said first and second summing circuits respectively.

10. The receiver of claim 9 further including means for providing to said control means, signals representing sums and differences of successive outputs of said first and second squaring circuits.

11. The receiver of claim 10 wherein said control means includes means for controlling the rate and phase of clock pulses provided by a second clock pulse generator to said first memory.

12. The receiver of claim 1 wherein said receiver is used in a Global Positioning System and said modulated carrier signals include P-code data.

13. A method of receiving bandspread carrier signals, said method comprising the steps of:
    (a) intercepting a plurality of signals;
    (b) selecting a received signal from said plurality of signals;
    (c) converting said received signal to an intermediate frequency signal;
    (d) digitizing said intermediate frequency signal by linearly dividing the amplitude range of said intermediate frequency signal into more than two subranges and assigning consecutive digital numbers to said subranges;
    (e) demodulating said digitized signal with a pseudo-random code for providing a modulated carrier signal;
    (f) summing and storing successive samples of said modulated carrier signal at successive time intervals to provide a stored sum;
    (g) generating I and Q component signals from said stored sample of the form:

$I = -Z(O) + 2Z(pi) - Z(2pi)$ and $Q = -Z(O) + 2Z(pi/2) - 2Z(3pi/2) + Z(2pi)$;

and
    (h) utilizing said I and Q signals to control the rate and timing of the modulation of said digitized signal with said pseudo-random code.

* * * * *